Dec. 28, 1926.
J. A. THOMAS
1,611,960
APPARATUS FOR SPLITTING BOLTS OF FABRIC, ETC
Filed Oct. 28, 1924
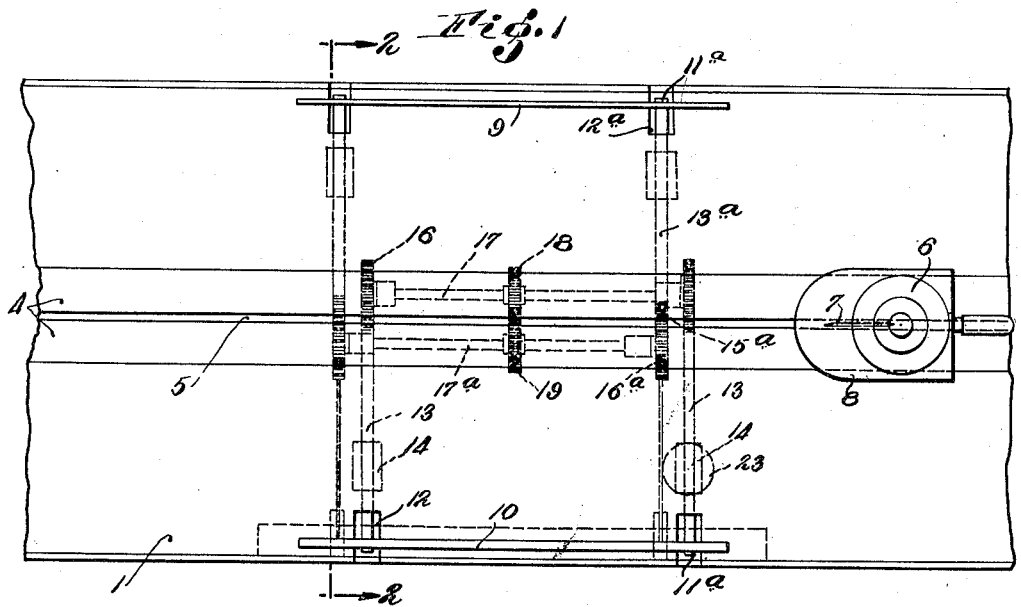
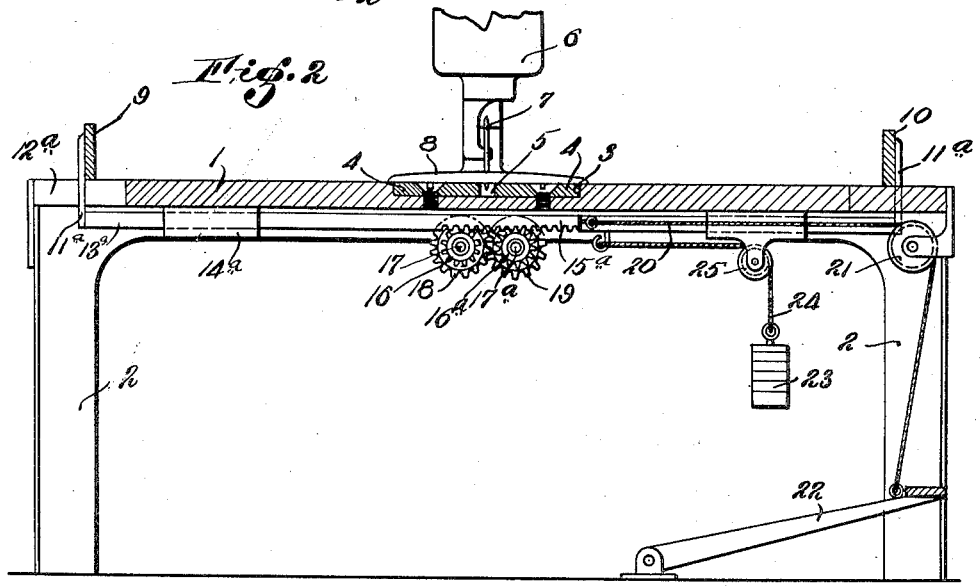
Inventor:
James A. Thomas
by Roberts, Roberts & Cushman,
Attys.

Patented Dec. 28, 1926.                                    1,611,960

UNITED STATES PATENT OFFICE.

JAMES A. THOMAS, OF TROY, NEW YORK, ASSIGNOR TO CLUETT, PEABODY & CO. INC.,
OF TROY, NEW YORK, A CORPORATION OF NEW YORK.

APPARATUS FOR SPLITTING BOLTS OF FABRIC, ETC.

Application filed October 28, 1924. Serial No. 746,363.

This invention relates to an apparatus for positioning material on a work support particularly useful for positioning handkerchief material with respect to a guide along which a cutter is directed for slicing the material in one step of the process of manufacturing handkerchiefs.

In the process of manufacturing handkerchiefs it is customary to unroll the cloth upon a table, measure the width of the material and center it with respect to a guide. Thereafter a cutter usually directed by hand is moved along the guide to slice the material. Obviously this is a clumsy and objectionable procedure owing to the time required in measuring the material and in centering it with respect to the guide and if great care is not exercised the material will not be sliced exactly through the center so that considerable waste results.

Objects of the invention are to overcome the above difficulties; to provide an apparatus for positioning material on a support with respect to a guide in an extremely simple manner; and to provide such apparatus having the new and improved feature of construction and arrangement hereinafter described.

The invention is shown in one of the preferred forms in the accompanying drawings in which:—

Fig. 1 is a top plan view of the apparatus; and

Fig. 2 is a transverse section taken on the line 2—2 of Fig. 1.

The embodiment of the invention illustrated comprises a table or flat work support 1 of suitable proportions which is supported by upright legs 2. In the upper surface of the work support is a recess 3 in which is disposed a pair of guide plates 4 flush with the surface of the work support and suitably secured thereto as by screws. The guide plates 4 are separated from each other a slight distance to form a guide slot 5, which preferably is positioned centrally intermediate the sides of the work support and extends substantially the entire length thereof.

In splitting handkerchief material a bolt of such material is placed upon the work support 1 and unfolded a suitable distance and a cutting device 6 is guided by hand along the table to cut or slice the material. Such cutting device ordinarily comprises an electrically driven rotating cutting disc 7 and supporting plate 8, and the disc 7 is guided along the slot 5, the supporting plate 8 being inserted between the material and the work support 1. By this means it will be observed that a considerable length of material may be cut in an extremely simple manner and within a short space of time.

Before the handkerchief material is cut or sliced it is centered with respect to the guide slot 5 so that the material is cut accurately through the center. For this purpose guide rails 9 and 10 are arranged in an upright position and in parallel relation on the opposite sides of the work support. These rails are connected together to be concomitantly moved toward each other according to the will of the operator and automatically returned to normal position adjacent the side edges of the work support 1. It will be evident that the bolt of cloth on the work support may thus be positioned or centered with respect to the guide slot 5 accurately and with a minimum amount of trouble.

The connections between the guide rails 9 and 10 comprise depending plates 11 suitably secured to the opposite ends of the rail 10 and these plates are movable cross-wise of the work support 1 in slots 12. Secured to the lower end of the plates 11 beneath the work support are rods 13 which extend toward the opposite side and are supported by brackets 14 on the under side of the work support. Formed on the inner ends of the rods 13 are racks 15 which mesh with pinions 16 fast to a longitudinally extending shaft 17 supported from the under side of the work support. The guide rail 9 is provided with similar connections and has depending plates 11ª movable in slots 12ª, rods 13ª having racks 15ª which mesh with pinions 16ª fast to a longitudinally extending shaft 17ª. Intermediate the ends of the shafts 17 and 17ª are fixed gears 18 and 19 respectively which mesh with each other.

In order conjointly to actuate both guide rails 9 and 10 a cable 20 is suitably connected at one end to the inner end of one of the rods 13, passes over a sheave 21 and extends downwardly to a treadle 22 to which the opposite end is fastened. It will be evident that the operator may conveniently move the guide rails 9 and 10 correspondingly toward each other by depressing the treadle 22 and thus center the material quickly and accurately.

When the operator releases the pressure on the treadle 22 a weight 23 automatically moves the guide rails 9 and 10 to normal position adjacent the side edges of the work support 1, a cable 24 passing over a sheave 25 connecting the weight 23 to the inner end of the rods 13ᵃ. It will be thus observed that the guide rails 9 and 10 are separated from each other in a corresponding manner, a pull exerted on one rod 13ᵃ being transmitted through the connections described conjointly to operate both sets of rods.

A cardinal feature of the invention consists in moving a pair of guide members relative to a fixed guide in a corresponding manner so that the movement of the members is concomitant in opposite directions. The extreme simplicity of construction and ease of operation contribute to an apparatus decidedly useful for the purpose intended, although it will be understood that the apparatus may be used to advantage in many places.

I claim:

1. An apparatus of the character described comprising a work support having a guide, a pair of positioning members on said support on opposite sides of the guide and movable towards and away from the latter, means for moving said members conjointly relative to said guide to position material on said support with respect to said guide, and cutting means movable along said guide between said members.

2. An apparatus of the character described comprising a work support having a guide slot, a pair of positioning members on said support arranged on opposite sides of said slot, means to move said members conjointly towards said slot to position material on said support with respect to the slot, and cutting means movable longitudinally of said slot between said guiding members.

3. An apparatus of the character described comprising a work support having a guide for a cutter, positioning members on opposite sides of the guide, means to move said members relative to the guide to position material for cutting, and a cutter movable longitudinally of said slot between said guides.

4. An apparatus of the character described comprising a work support having a guide for a cutting instrumentality, positioning members on opposite sides of the guide, means conjointly to move said members relative to said guide thereby to position the material properly for cutting, and means automatically to return said members to normal position.

5. An apparatus of the character described comprising a work support having a guide for a cutter, positioning members on opposite sides of the guide, a cutter movable longitudinally of said guide between said positioning members, and means to move said members conjointly towards each other, said means including interconnected elements and operating means extending to one side of the support.

6. An apparatus of the character described comprising a work support having a guide for a cutting instrumentality, positioning members on opposite sides of the guide, means conjointly to move said members toward each other in parallel relation to the guide, and means for automatically moving said members away from each other.

7. An apparatus of the character described comprising a work support having a guide for a cutting instrumentality, positioning members on opposite sides of the guide, a treadle connected conjointly to move said members toward each other in parallel relation to the guide, and means for automatically moving said members away from each other.

8. An apparatus of the character described comprising a work support having a guide for a cutting instrumentality, positioning members on opposite sides of the guide arranged to engage the material on the support, and means conjointly to move said members toward each other in parallel relation thereby to position the material relative to the guide, said means including interengaging toothed members, and operating means extending to one side of said support.

9. An apparatus of the character described comprising a work support having a guide for a cutting instrumentality, positioning members on opposite sides of the guide arranged to engage the material on the support, and means conjointly to move said members toward each other in parallel relation thereby to position the material relative to the guide, said means including racks connected to each member, pinions meshing with said racks, and a treadle connected to one of said members.

10. An apparatus of the character described comprising a work support having a slot for guiding a cutter, positioning members on opposite sides of the slot for centering material relative thereto, means including rack and pinion for conjointly moving said members toward each other in parallel relation, and means automatically to return said members to normal position.

11. Apparatus of the character described comprising a work support, a cutter between the sides thereof, positioning means arranged adjacent opposite sides of said support, longitudinally movable guided supporting elements for said positioning means, and means cooperating with said supporting means to move the same conjointly towards and from each other including a power transmitting device rotating on an axis extending transversely of the path of movement of said supporting elements.

12. Apparatus of the character described comprising a work support, a cutter between the sides thereof, guiding means movable relatively to said support towards and from each other, means for interconnecting the same for simultaneous movement in opposite directions, and means for transmitting power to one of the same to effect simultaneous movement of both.

13. Apparatus of the character described comprising a work support, a cutter between the sides thereof, relatively movable guiding means movable towards and from said cutter, means connecting said guiding means for compulsory simultaneous movement towards each other, and means for transmitting power to one of said guiding means to cause simultaneous movement of both of the same.

Signed by me at Troy, N. Y. this 23 day of October 1924.

JAMES A. THOMAS.